United States Patent
Vaghani

(10) Patent No.: US 12,462,330 B2
(45) Date of Patent: Nov. 4, 2025

(54) INFORMATION PROCESSING APPARATUS, IMAGE PROCESSING METHOD AND COMPUTER READABLE MEDIUM

(71) Applicant: NEC Corporation, Tokyo (JP)

(72) Inventor: Darshit Vaghani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 408 days.

(21) Appl. No.: 18/009,843

(22) PCT Filed: Jun. 15, 2020

(86) PCT No.: PCT/JP2020/023459
§ 371 (c)(1),
(2) Date: Dec. 12, 2022

(87) PCT Pub. No.: WO2021/255796
PCT Pub. Date: Dec. 23, 2021

(65) Prior Publication Data
US 2023/0222621 A1 Jul. 13, 2023

(51) Int. Cl.
*G06T 1/60* (2006.01)
*G06F 3/06* (2006.01)

(52) U.S. Cl.
CPC .............. *G06T 1/60* (2013.01); *G06F 3/0626* (2013.01); *G06F 3/0659* (2013.01); *G06F 3/0673* (2013.01)

(58) Field of Classification Search
USPC ........................................................ 382/305
See application file for complete search history.

(56) References Cited

U.S. PATENT DOCUMENTS

| 4,302,775 A | 11/1981 | Widergren et al. |
| 6,219,023 B1 | 4/2001 | Kim |
| 8,848,480 B1 * | 9/2014 | Pelley ................ G11C 7/22 365/189.04 |
| 2009/0184971 A1 * | 7/2009 | Sato ................... G09G 3/3611 345/545 |
| 2014/0177324 A1 * | 6/2014 | Liu ........................ G11C 8/16 365/230.03 |

FOREIGN PATENT DOCUMENTS

WO   WO-2021255796 A1 * 12/2021 ........... G06F 3/0626

OTHER PUBLICATIONS

International Search Report for PCT Application No. PCT/JP2020/023459, mailed on Sep. 1, 2020.
Written opinion for PCT Application No. PCT/JP2020/023459, mailed on Sep. 1, 2020.
Paul N. Whatmough, Chuteng Zhou, Patrick Hansen, Shreyas Kolala Venkataramanaiah, Jae-sun Seo, Matthew Mattina, "Fixynn: Efficient Hardware for Mobile Computer Vision via Transfer Learning" Proceedings of the 2nd SysML Conference, Palo Alto, CA, USA, 2019.

* cited by examiner

Primary Examiner — Jacky X Zheng

(57) ABSTRACT

An object is to provide an information processing apparatus capable of reducing a circuit area. An information processing apparatus (1) according to the present disclosure includes a plurality of memories (11A, 11B) configured to store one row of data of input image data as a whole, a plurality of multiplexers (12A, 12B) configured to select one of the memories to take a part of the one row of data from the selected memory; and a hardware controller (13) configured to select one of the memories storing the part of the one row of data.

7 Claims, 12 Drawing Sheets

|        | 1st Phase | 2nd Phase | 3rd Phase | 4th Phase |
|--------|-----------|-----------|-----------|-----------|
| SRAM-1 | W | R | R | R |
| SRAM-2 | R | W | R | R |
| SRAM-3 | R | R | W | R |
| SRAM-4 | R | R | R | W |

Fig. 9

|      | 1st Phase | 2nd Phase | 3rd Phase | 4th Phase |
|------|-----------|-----------|-----------|-----------|
| MUX1 | SRAM-2 | SRAM-3 | SRAM-4 | SRAM-1 |
| MUX2 | SRAM-3 | SRAM-4 | SRAM-1 | SRAM-2 |
| MUX3 | SRAM-4 | SRAM-1 | SRAM-2 | SRAM-3 |

Fig. 10

| | Reference linebuffer | Linebuffer 30 |
|---|---|---|
| Parameter | K | N * K |
| | W | W / N |
| | S | S |
| Size of buffer memory | W * (K + S) | (W / N) * (N * K + S) |

| | Reference linebuffer | Linebuffer 30 |
|---|---|---|
| Size of buffer memory | W * (K + S) | (W / N) * (N * K + S) |
| (a) K=3, S=1, W=100, N=2 | 400 (100%) | 350 (87.50%) |
| (b) K=3, S=1, W=100, N=4 | 400 (100%) | 325 (81.25%) |
| (c) K=3, S=2, W=100, N=2 | 500 (100%) | 400 (80.00%) |
| (d) K=5, S=1, W=100, N=2 | 600 (100%) | 550 (91.67%) |

[Fig. 22]

|  | 1st Phase | 2nd Phase | 3rd Phase | 4th Phase | 5th Phase | 6th Phase | 7th Phase |
|---|---|---|---|---|---|---|---|
| SRAM-1 | W | R | R | R | R | R | R |
| SRAM-2 | R | W | R | R | R | R | R |
| SRAM-3 | R | R | W | R | R | R | R |
| SRAM-4 | R | R | R | W | R | R | R |
| SRAM-5 | R | R | R | R | W | R | R |
| SRAM-6 | R | R | R | R | R | W | R |
| SRAM-7 | R | R | R | R | R | R | W |

|      | 1st Phase | 2nd Phase | 3rd Phase | 4th Phase | 5th Phase | 6th Phase | 7th Phase |
|------|-----------|-----------|-----------|-----------|-----------|-----------|-----------|
| MUX1 | SRAM-3 | SRAM-4 | SRAM-5 | SRAM-6 | SRAM-7 | SRAM-1 | SRAM-2 |
| MUX2 | SRAM-5 | SRAM-6 | SRAM-7 | SRAM-1 | SRAM-2 | SRAM-3 | SRAM-4 |
| MUX3 | SRAM-7 | SRAM-1 | SRAM-2 | SRAM-3 | SRAM-4 | SRAM-5 | SRAM-6 | ic
INFORMATION PROCESSING APPARATUS, IMAGE PROCESSING METHOD AND COMPUTER READABLE MEDIUM

This application is a National Stage Entry of PCT/JP2020/023459 filed on Jun. 15, 2020, the contents of all of which are incorporated herein by reference, in their entirety.

TECHNICAL FIELD

The present disclosure relates to an information processing apparatus, an image processing unit, an information processing method, and a non-transitory computer readable medium.

BACKGROUND ART

Real time vision systems like robotics, intelligent vehicles, surveillance, inspection systems and so forth are equipped with an image processing system (IP system).

The hardware architecture of the image processing system is described in Non Patent Literature 1 (NPL1). The hardware architecture mentioned in the NPL1 is energy efficient hardware architecture of the image processing system, and performing of feature extraction operations is proposed in NPL1.

CITATION LIST

Non Patent Literature

NPL 1: "FIXYNN: EFFICIENT HARDWARE FOR MOBILE COMPUTER VISION VIA TRANSFER LEARNING" Paul N. Whatmough, Chuteng Zhou, Patrick Hansen, Shreyas Kolala Venkataramanaiah, Jae-sun Seo, Matthew Mattina, Proceedings of the 2nd SysML Conference, Palo Alto, CA, USA, 2019.

SUMMARY OF INVENTION

Technical Problem

An ordinary IP system includes a linebuffer, which is upstream of an image processing logic (IPL). Generally, a large-sized linebuffer helps to increase throughput via parallelism. However, the hardware architecture of the linebuffer in the IP system in real time applications requires a large silicon area, which is undesirable.

In the NPL 1, the hardware architecture has a problem that the hardware architecture of the linebuffer occupies a large area and thus is not area-efficient.

An object of the present disclosure is to provide an information processing apparatus, an image processing unit, an information processing method, and a non-transitory computer readable medium capable of reducing a circuit area.

Solution to Problem

In a first example aspect, an information processing apparatus includes: a plurality of memories configured to store one row of data of input image data as a whole, a plurality of multiplexers configured to select one of the memories to take a part of the one row of data from the selected memory; and a controller configured to select one of the memories storing the part of the one row of data.

In a second example aspect, an image processing unit includes: a plurality of memories configured to store one row of data of input image data as a whole, a plurality of multiplexers configured to select one of the memories to take a part of the one row of data from the selected memory; and a controller configured to select one of the memories storing the part of the one row of data.

In a third example aspect, an information processing method includes: storing one row of data of input image data into a plurality of memories as a whole, selecting one of the memories to take a part of the one row of data from the selected memory; and selecting one of the memories storing the part of the one row of data.

In a fourth example aspect, a non-transitory computer readable medium storing a program to causes a computer to execute: storing one row of data of input image data into a plurality of memories as a whole, selecting one of the memories to take a part of the one row of data from the selected memory; and selecting one of the memories storing the part of the one row of data.

Advantageous Effects of Invention

According to the present disclosure, it is possible to provide an information processing apparatus, an image processing unit, an information processing method, and a non-transitory computer readable medium capable of reducing a circuit area.

BRIEF DESCRIPTION OF DRAWINGS

FIG. 9 is a list of a status of the SRAM memory lines 235 in each phase;

FIG. 10 is a list of the SRAM memory lines 235 selected by a multiplexer 236 in each phase;

DESCRIPTION OF EMBODIMENTS (Outline of IP System)

Prior to explaining embodiments according to this present disclosure, an outline of a reference IP system is explained with reference to FIGS. 1 to 12.

Figure 1:
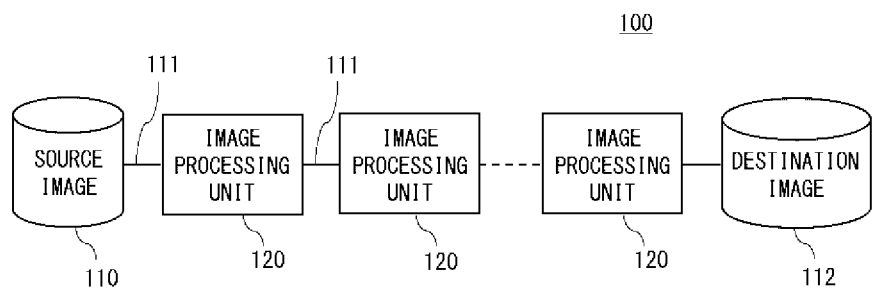
FIG. 1 is a configuration diagram illustrating the structure of an image processing system 100.

In FIG. 1, structure of the IP system 100 is illustrated. The block diagram of an IP system 100 which performs the image processing task on the source image 110. The IP system 100 takes source image 110 as input, performs one or more image processing operation(s) and outputs the destination image 120.

The Image Processing system (hereafter, IP system) 100 contains one or more image processing units 120 (IPU) as shown in FIG. 1. The IPU 120 takes image pixel data 111 as input and processes it. After that, it outputs the processed data to the next IPU 120. The image pixel data 111 is the one processed by the previous IPU 120 or the source image 110 itself.

Figure 2:
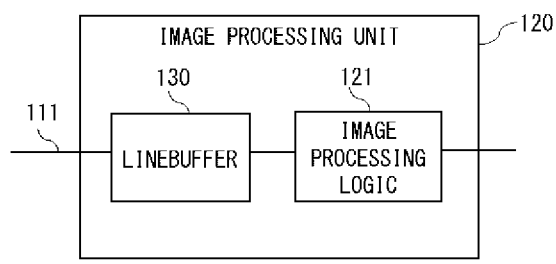
FIG. 2 is a configuration diagram illustrating the structure of an image processing unit 120.

The block diagram of the IPU 120 is shown in FIG. 2. The IPU 120 includes an image processing logic (IPL) 121 and a linebuffer 130. The IPL 121 may perform several kinds of image processing operations including image modification operations, image feature extraction operations and so forth. The image modification operations may include operations such as color interpolation, image sharpening, color correction, and so forth on the image pixel data 111. The image feature extraction operations may include operations like convolution, deconvolution, and so forth on the image pixel data 111. When a sequence of the image feature extraction operations is performed on the source image 110, the IP system 100 is also referred to as a convolution neural network model.

Figure 3:
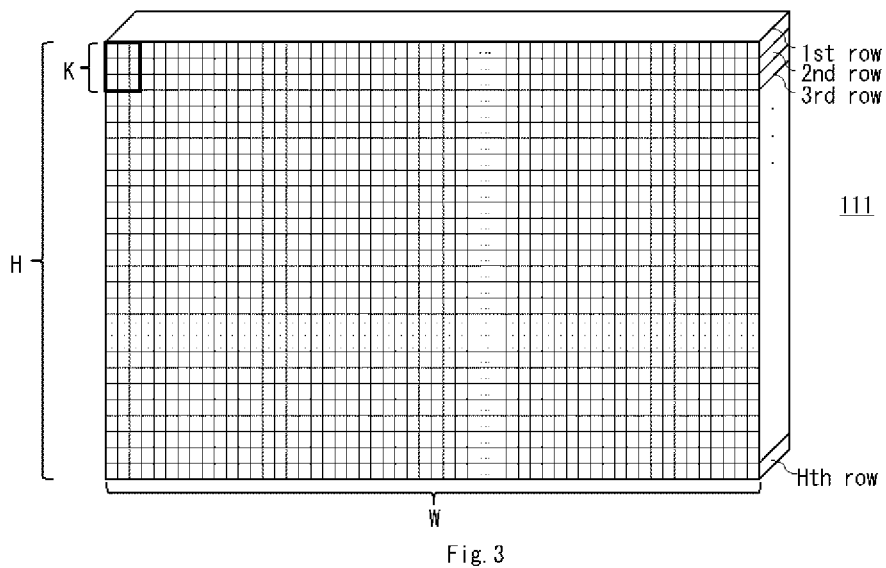
FIG. 3 is a figure illustrating the structure of an image pixel data 111.

The image pixel data 111 as an input of the first IPU 120 is the source image 110 and the image pixel data 111 as an input of the remaining IPUs 20 is the intermediate image pixel data. In the image pixel data 111 of height H, width W in a particular IPU 120, the IPL 121 processes K*K pixel(s) data at a time and slides across the image pixel data 111 with a stride of S, where K kernel size and S stride size are greater than or equal to 1 and less than or equal to H and W. FIG. 3 shows a structure of the image pixel data 111. The image pixel data 111 is configured with H rows of pixels, and each row of pixels has a width W. In FIG. 3, K is equal to 3 and it is less than H.

The primary task of the linebuffer 130 is to buffer the image pixel data 111. During the image processing operation performed by the IPL 121 on the image pixel data 111, some or all pixel data are reused by the IPL 121. In order to facilitate the reuse of pixel data, the linebuffer 130 buffers the image pixel data 111.

Figure 4:
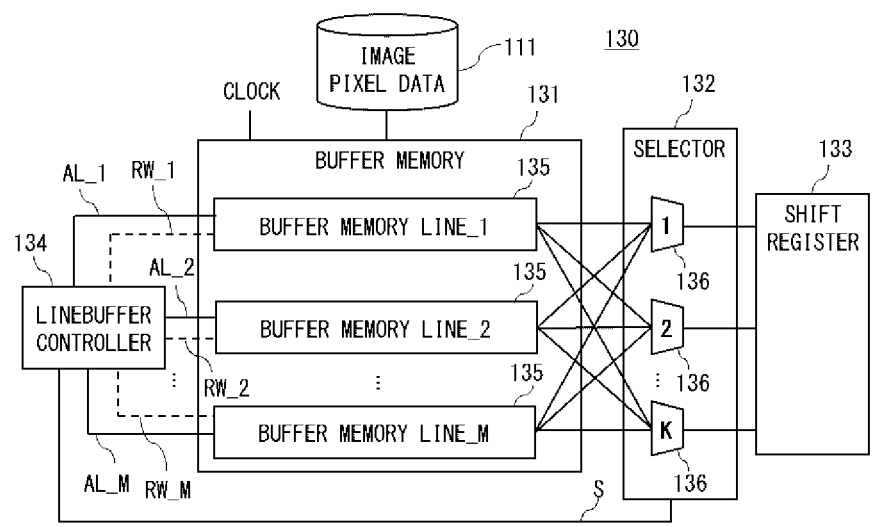
FIG. 4 is a configuration diagram illustrating the structure of a linebuffer 130.

As shown in FIG. 4, the linebuffer 130 includes a buffer memory 131, a selector 132, a shift register 133, and a linebuffer controller 134. The function of the buffer memory 131 in the linebuffer 130 is to store the image pixel data 111. The buffer memory 131 can be composed of memory elements like SRAM (Static Random-Access Memory), a shift register and so forth. The buffer memory 131 includes multiple buffer memory lines 135 from the 1st to the Mth. Each buffer memory line 135 may include SRAM.

Generally, in the structure of the linebuffer 130, one buffer memory line 135 stores one row of pixel(s) of the image pixel data 111. The one row of pixels is written into the buffer memory by using a writing clock, and is read by using a reading clock.

In a particular IPU 120, a size of each buffer memory line 135 in the linebuffer 130 is equal to W in terms of pixel data. The number of buffer memory lines 135 is equal to a sum of K of the next IPL 121 and S of the next IPU's IPL. In FIG. 4, there are M (=K+S) buffer memory lines 135. The total number of pixel data stored in the buffer memory 131 of the linebuffer 130, also referred to as a total size of the buffer memory 131, is equal to a product of W and a sum of K and S, i.e. W*(K+S) (=W*M).

A problem with such a large buffer memory is that a silicon area required by the large buffer memory on a chip is very large. Generally, in order to reduce the area occupied by the buffer memory 131, a single ported SRAM memory is preferred compared to a dual ported SRAM memory.

Selector 132 has multiple multiplexers 136. The functionality of the multiplexers 136 is to select pixel(s) of only one buffer memory line 135 from the pixel(s) of multiple buffer memory lines 135 based on the corresponding select signal at the time. For this purpose, (K+S)×1 is the size of the multiplexers 136 used in the linebuffer 130. The number of multiplexers 136 in the linebuffer 130 is equal to K. All the K multiplexers 136 have input from all K+S(=M) buffer memory lines 135 as shown in FIG. 3.

All the K multiplexers 136 output only pixels of K buffer memory lines 135 (i.e. one buffer memory line by one multiplexer). Hence, the total number of pixels output from all the multiplexers 136 are K pixels. K pixels given as output by multiplexers 136 are accumulated by the shift register 133.

Figure 5:
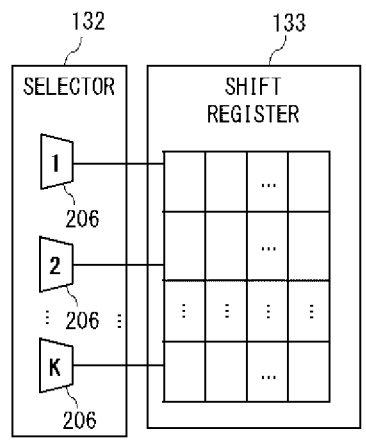
FIG. 5 is a configuration diagram illustrating a selector 132 and a shift register 133.

As shown in FIG. 5, the shift register 133 stores the output pixels as K*K pixels. The K*K pixels from the shift register 133 are read out by the IPL 121 to perform the image processing operations. The size of the shift register 133 is equal to K*K in terms of pixels data.

Referring back to FIG. 4, the linebuffer controller 134 generates address line signals from AL_1 to AL_M for all the buffer memory lines 135. The total number of the address line signals generated by the linebuffer controller 134 is equal to the number of buffer memory lines 135, i.e. sum of K and S(=M). Furthermore, each address line signal indicates address 0 to W−1.

Furthermore, the linebuffer controller 134 generates read signals from RW_1 to RW_M for all the buffer memory lines 135 as shown in FIG. 3. Each read signal decides read or write state of each buffer memory line 135. The total number of read signals generated by the linebuffer controller 134 is equal to the number of buffer memory lines 135, i.e. M.

Figure 6:
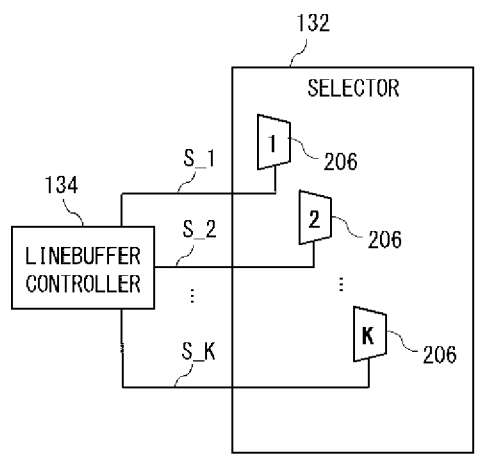
FIG. 6 is a configuration diagram illustrating the selector 132 and a linebuffer controller 134.

In addition, the linebuffer controller 134 generates the select signals (control signals) S for all the multiplexers 136 in the linebuffer 130. The total number of the select signals S generated by the linebuffer controller 134 is equal to the number of the multiplexers 136, i.e. K. More specifically, as shown in FIG. 6, the linebuffer controller 134 sends select signals S_1 to S_K to each multiplexer 136.

As explained above, the necessary signals required for the flow of the image pixel data 111 from input of the linebuffer 130 via the buffer memory 131, selector 132, and shift register 133 to the output of the linebuffer 130 are generated by the linebuffer controller 134.

The total time to read out or write in a whole buffer memory line is referred to as one phase. The number of cycles in one phase is equal to the number of the cycles required to read out or write in a whole buffer memory line. The total number of phases is equal to the number of buffer memory lines, i.e. K+S(=M).

The occurrence of the phase goes in the round robin fashion. The values of the signals generated by the linebuffer controller 134 in a particular phase will be the same when that particular phase is repeated. If a buffer memory line 135 has high-level read signal in a particular cycle, then the buffer memory line 135 is said to be in a read state, while if the read signal is at a low-level, then the buffer memory line 135 is said to be in a write state.

Initially, the first row of the image pixel data 111 is written in any one of the buffer memory line 135. Then a consecutive row of the image pixel data 111 is written in every phase in any of the buffer memory line 135. As soon as the K rows of the image pixel data 111 are written in the buffer memory 131, the selector 132 outputs K pixels from respective K buffer memory lines 135.

The number of cycles from the first pixel of the image pixel data 111 written in the buffer memory 131 to the first pixel read out of the buffer memory 131 is called the latency of the buffer memory 131. The smaller the number of latency cycles, the sooner the shift register 133 accumulates the K*K pixel and the sooner the IPL 121 performs the image processing operations. As mentioned earlier, the buffer memory employed to store the image pixel data can be a SRAM based buffer memory, shift register based buffer memory and so forth.

Figure 7:
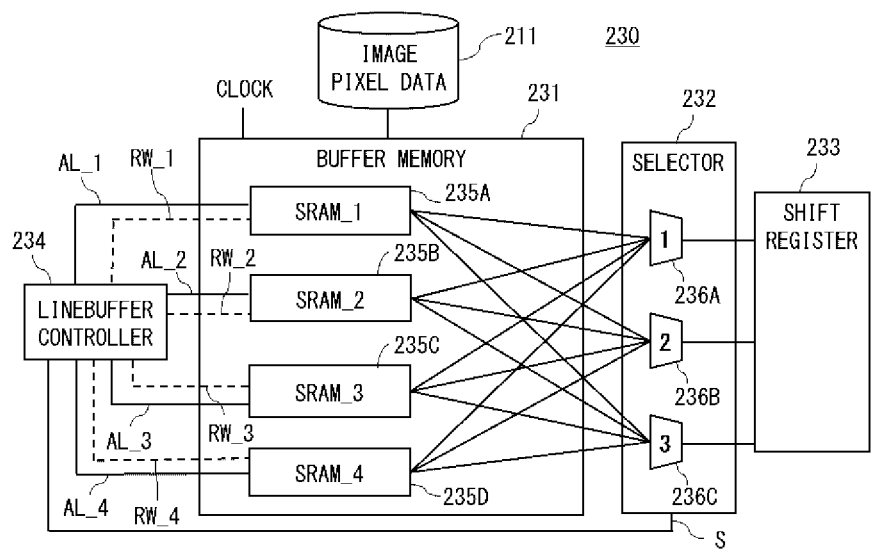
FIG. 7 is a configuration diagram illustrating the structure of a linebuffer 230.

FIG. 7 shows a sample example of the structure of a linebuffer with K=3, and S=1 (i.e. M=4). The structure of the linebuffer 230 includes the single ported SRAM memory-based buffer memory 231, selector 232, shift register 233 of size 3×3 in terms of pixel data, and linebuffer controller 234.

The buffer memory 231 includes four SRAM memory lines 235A to 235D. Furthermore, the selector 232 includes three 4×1 multiplexers 236A to 236C.

In an initial three phases, the example linebuffer 230 buffers three rows of image pixel data 211 in three SRAM memory lines 235A, 235B, and 235C. The number of cycles required to write three rows in the three SRAM memory lines (i.e. one row for each SRAM memory line) is 3*W cycles, i.e. 3 phases.

Figure 8:
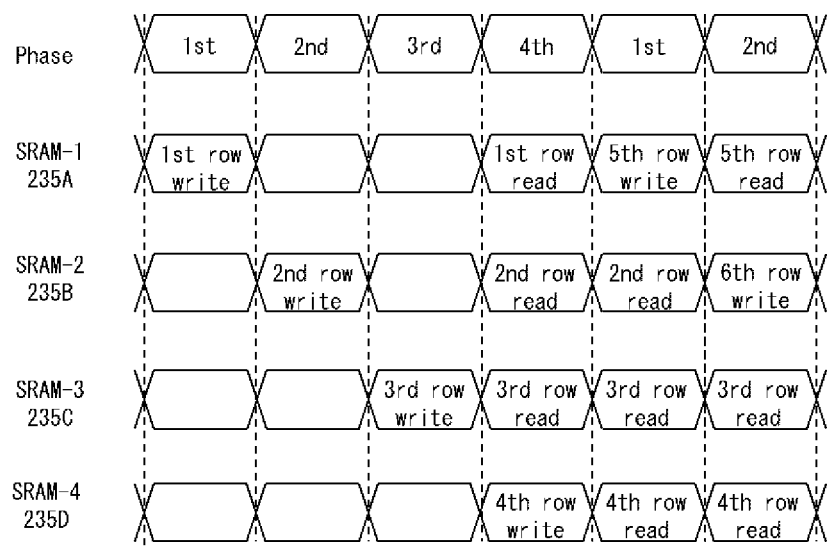
FIG. 8 is a timing diagram in terms of a phase of the data flow in SRAM memory lines of the linebuffer 130.

As shown in FIG. 8, in the 1st phase, the 1st entire row of the image pixel data 211 is written in the SRAM-1 memory line 235A. Similarly, in the 2nd and 3rd phases, the 2nd and 3rd rows of the image data are written in the SRAM-2 235B and SRAM-3 235C memory lines respectively as shown in FIG. 8.

In the 3rd phase, after one cycle of writing the one pixel of the 3rd row of the image pixel data 211 in the SRAM-3 memory line 235C, all the required three pixels (one from each of the three rows of image pixel data 211) for the multiplexers 236 to read out are available in the SRAM memory lines 235. However, as a single ported SRAM memory-based buffer memory is employed and the SRAM-3 memory line 235C is in a write state, a reading operation from the SRAM-3 memory line 235C cannot be started by the multiplexers in the 3rd phase.

From the next cycle after the 3*W cycles, i.e. in the 4th phase, the three multiplexers output 3 pixels from the three SRAM memory lines, i.e. SRAM-1 235A, SRAM-2 235B and SRAM-3 235C memory lines in the linebuffer 230. In the same phase, because S=1, the linebuffer 230 buffers the next row of image pixel data 211 in SRAM-4 memory line 235D.

In all the phases, any one SRAM memory line remains in a write state until a corresponding entire SRAM memory line has been written. FIG. 9 shows the states of the SRAM memory lines 235 in the linebuffer 230 in each phase. In FIG. 9, "R" means the read state, and "W" means the write state. In the 1st phase, the SRAM_1 memory line 235A is in the write state, while the SRAM memory lines 235B to 235D are in the read state. In the 2nd phase, the SRAM_2 memory line 235B is in the write state, while the SRAM memory lines 235A, 235C and 235D are in the read state. In the 3rd phase, the SRAM_3 memory line 235C is in the write state, while the SRAM memory lines 235A, 235B and 235D are in the read state. In the 4th phase, the SRAM_4 memory line 235D is in the write state, while the SRAM memory lines 235A to 235C are in the read state.

In the write states, the read signals are generated by the linebuffer controller 234 of the linebuffer 230. The address line signal goes from the first address to the last address in the respective SRAM memory line. The total number of phases is equal to four. The number of multiplexers is equal to three as shown in FIG. 7.

FIG. 10 shows the SRAM memory lines 235 selected in the consecutive phase by the multiplexers. In FIG. 10, "MUX1" means the multiplexer 236A, "MUX2" means the multiplexer 236B, and "MUX3" means the multiplexer 236C. In the 1st phase, the multiplexer 236A selects the SRAM_2 memory line 235B, the multiplexer 236B selects the SRAM_3 memory line 235C, and the multiplexer 236C selects the SRAM_4 memory line 235D. In the 2nd phase, the multiplexer 236A selects the SRAM_3 memory line 235C, the multiplexer 236B selects the SRAM_4 memory line 235D, and the multiplexer 236C selects the SRAM_1 memory line 235A. In the 3rd phase, the multiplexer 236A selects the SRAM_4 memory line 235D, the multiplexer 236B selects the SRAM_1 memory line 235A, and the multiplexer 236C selects the SRAM_2 memory line 235B. In the 4th phase, the multiplexer 236A selects the SRAM_1 memory line 235A, the multiplexer 236B selects the SRAM_2 memory line 235B, and the multiplexer 236C selects the SRAM_3 memory line 235C. In this way, each multiplexer selects one of the SRAM memory lines in order.

The shift register 233 takes three pixels data from the multiplexers as input. The shift register 233 accumulates 3×3 pixels and is read out by the IPL 121. With a stride of S=1, the IPL 121 continuously reads 3×3 pixels from the shift register 233. The stride S is a stride of the image pixel data, especially a next layer's stride. The next layer is the one which is connected to the shift register 233. In another words, this layer is connected to outputs of the plurality of multiplexers 236. In the structure of the linebuffer 230, 3*W cycles are the latency time after which one of the multiplexers outputs the pixel data from one of the SRAM line memories 235.

Figure 11:
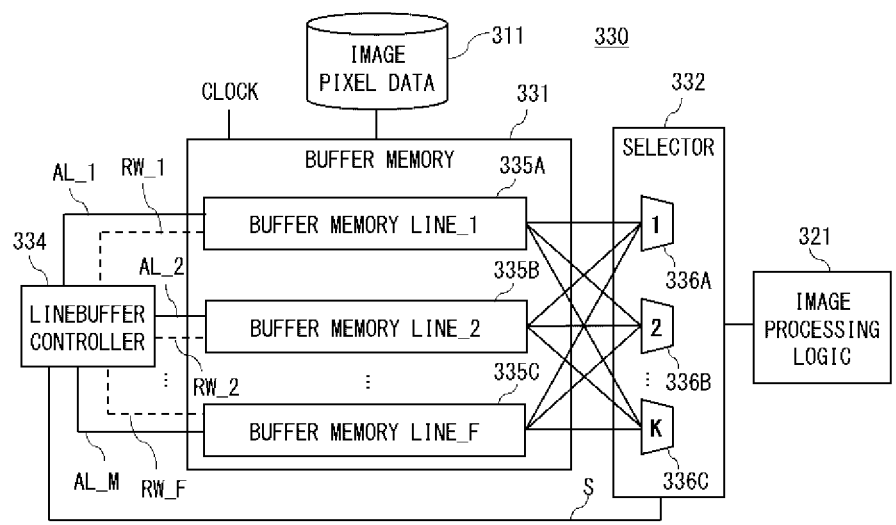
FIG. 11 is a configuration diagram illustrating the structure of a linebuffer 330.
Figure 12:
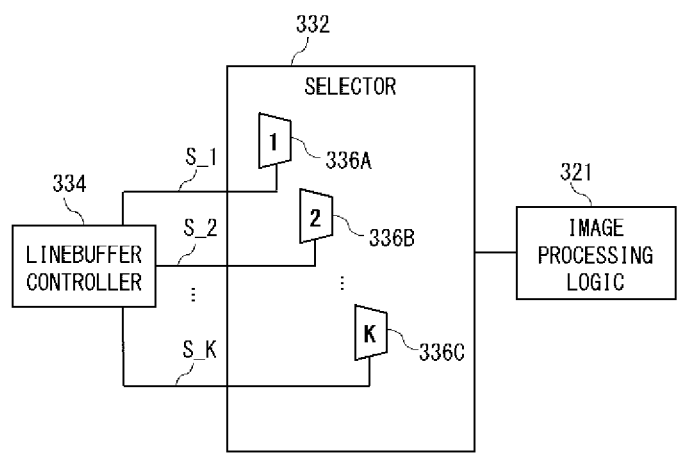
FIG. 12 is a configuration diagram illustrating the connection of a selector 332 and a linebuffer controller 334.

FIGS. 11 and 12 show another variant example of the structure of the linebuffer employed in the IPU. In FIG. 11, in the linebuffer 330, there is no shift register, unlike in the linebuffer 130 in FIG. 4. The IPL 321 directly reads K*K pixel data from the buffer memory 331 of the linebuffer 330 via multiplexers as shown in FIGS. 11 and 12.

The buffer memory 331 includes multiple buffer memory lines 335A, 335B and 335C. The width of each buffer memory line in the linebuffer 330 is equal to W/K in terms of pixel data. The number of the buffer memory lines, which is shown as "F" in FIG. 11, is equal to the sum of S*K and K*K, i.e. (K*K+S*K).

The total number of pixel data stored in the buffer memory 331 of the linebuffer 330, also referred to as the total size of the buffer memory 331, is equal to the product of W and sum of K and S, i.e. W*(K+S). The size of the buffer memory in the linebuffer 230 is the same as that of the buffer memory in the linebuffer 330.

The linebuffer is one of a key logic in the IP system, and the linebuffer 230 or 330 is used to buffer the image pixel data in the IP system.

A first problem of the structure is that the structure of the linebuffer used to buffer the intermediate image data of the IPUs requires a large silicon area in the IP system. In other words, this structure is not area-efficient. The cost for manufacturing a large silicon area is large and such an area requires a large power budget. The reason for the first problem is the buffer memory stores full width of one row of image pixel data, which requires a very large area.

In detail, assume the case where the linebuffer is formed in one layer and it connects two adjacent layers in an Application Specific Integrated Circuit (ASIC), the next layer's Kernel size is equal to K, the next layer's input frame's min (height, width) is equal to D, the next layer's stride is equal to S, and the previous layer's channel size is equal to C. In this case, in terms of pixel, a size of one SRAM line in the linebuffer is D*C, and a total size of SRAM lines in the linebuffer is D*C*(K+S). Therefore, an area occupied by a linebuffer with such a size in the ASIC is large, and such ASICs are costly.

A second problem of the structure is that the linebuffer in the IP system has a large latency. The reason for the second problem is that in every IPU, the subsequent IPL waits to start the processing until sufficient intermediate image pixel data is buffered in the linebuffer.

Example embodiments of the present disclosure are described in detail below referring to the accompanying drawings. These embodiments are applicable to system and apparatus deploying IP systems like robotics, intelligent vehicles, surveillance, inspection systems and so forth.

First Example Embodiment

First, an information processing apparatus 1 according to a first example embodiment is explained with reference to FIG. 13.

Figure 13:
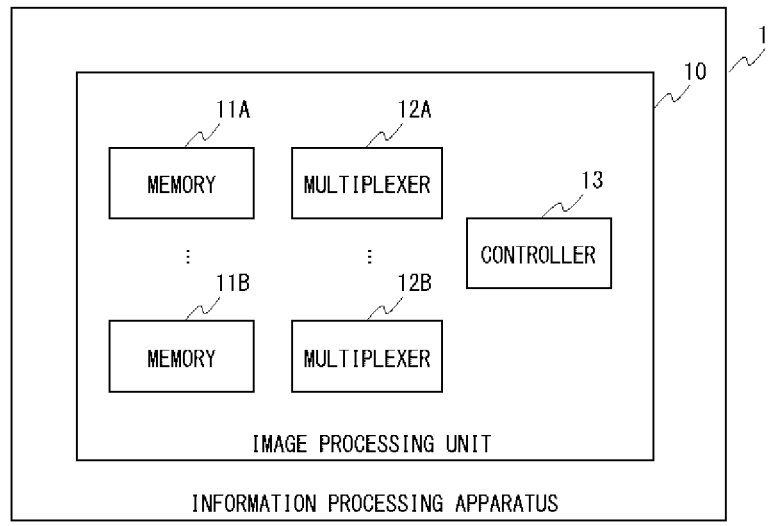
FIG. 13 is a configuration diagram illustrating the structure of a first example embodiment of the present disclosure.

Referring to FIG. 13, the first example embodiment of the present disclosure, an information processing apparatus 1, includes an IPU 10. Information processing apparatus 1 is, for example, a computer or a machine. The IPU 10 is, for example, a chip circuit or an integrated circuit and processes the input image data. It includes a plurality of memories 11A and 11B, a plurality of multiplexers 12A and 12B, and a controller 13. The input image data can be stored either inside or outside the information processing apparatus 1.

The memories 11A and 11B are configured to store one row of data of the input image data as a whole. In other words, each of the memory stores less than one row of data of the input image. In this example embodiment, "one row of data of the input image" means the row's length can be either width W of the input image data or height H of the input image data.

For example, the sum of the size of the memories 11A and 11B may be 1. The size of the memory 11A and that of the memory 11B may be equal to each other. In other words, each of the memories 11A and 11B may store half of one row of data of the input image. However, the size of the memory 11A and that of the memory 11B may be unequal. For example, the memory 11A may store two-thirds of one row of data of the input image and the memory 11B may store one-third of the one row of data of the input image.

The multiplexers 12A and 12B are configured to select one of the memories to take a part of the one row of data from the selected memory. The controller 13 is configured to select one of the memories storing the part of the one row of data. For example, the controller 13 sends the memories 11A and 11B signals to make them a write state.

More particularly, one row of data of the input image data may be divided into half, that is, into two equal data parts, and one of the data parts may be stored in each of the memories 11A and 11B by the control of the controller 13. However, the way of splitting one row of data is not limited to this example. For example, one row of data of the input image data may be split into a part that is two-thirds of the one row of data and another part that is one-third of the one row of data.

Next, the effect of the present example embodiment is described. As mentioned above, in the reference IP system, there are K+S buffer memory lines and the total size of the buffer memory is equal to W*(K+S), while K is kernel size, S is stride size and W is width of the image pixel data (i.e. the size of one buffer memory). However, in the first example embodiment, the size of one memory is less than width W or height H. The number of memories needs to be increased in terms of K, however, this shall not apply in terms of S. In conclusion, the total size of the memory in the first example embodiment can be less than the one in the reference IP system. Therefore, this helps to reduce circuit area in the IPU 10.

For example, in the case where one row of data of the input image data to be divided into two, that is, into two equal data parts and one of the data parts is stored in each of the memories 11A and 11B, whose sizes are both W/2, the total size of the memory is equal to (W/2)*(2K+S). Compared to the total size of the buffer memory in the reference IP system, the total size of the memory can be decreased by D1:

$$D1 = W*(K+S) - (W/2)*(2K+S) = W*S/2 \quad (1)$$

In the equation (1), the values of W and S are always positive, therefore D1 is always positive.

In the first example embodiment, there are the two memories 11A and 11B to store one row of data of the input image data. However, there may be more than two (three, four . . . ) memories to store the above data. For example, there may be three memories in the IPU 10 and the sum of the sizes of the three memories may be one row of data. Each of the three memories may store one-third of one row of data of the input image. However, one memory may store half of one row of data of the input image and each of the other two memories may store one-fourth of the one row of data of the input image. The way of splitting one row of data is not limited to these examples.

Furthermore, the sum of the sizes of the memories 11A and 11B may be over one row of the input image data, under conditions that the effect mentioned above continues. For example, in the case where one row of data of the input image data is divided into half, that is, into two equal data parts, and one of the data parts is stored in each of the memories 11A and 11B, the size of one memory may be from W/2 to (W/2)*W*(K+S)/((2K+S)*(W/2)). The same thing can be said about N memories, wherein N is a positive integer greater than 1.

The information processing apparatus 1 may include a multiple IPU 10 explained in the present example embodiment. Based on this structure, the information processing apparatus 1 can process complex image processing.

In the first example embodiment, a plurality of memory 11A and 11B, a plurality of multiplexer 12A and 12B, and a controller 13 are installed on the same IPU 10. However, these components may be installed on several units or chips in the information processing apparatus 1.

Second Example Embodiment

A second example embodiment of the disclosure is explained below referring to the accompanying drawings.

Figure 14:
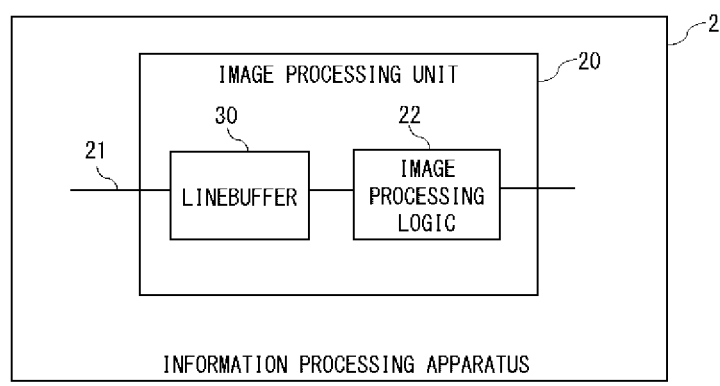
FIG. 14 is a configuration diagram illustrating the structure of a second example embodiment of the present disclosure.

Referring to FIG. 14, an information processing apparatus 2 includes an IPU 20 and consists of an IP system. The IPU 20 is, for example, a chip circuit or an integrated circuit and processes the image pixel data 21. The IPU 20 takes the image pixel data 21 as input and processes it, after that, it outputs the processed data. The image pixel data 21 is the one processed by the previous IPU or the source image itself.

The block diagram of the IPU 20 is shown in FIG. 14. The IPU 20 includes an IPL 22 and a linebuffer 30. The IPL 22 may perform several kinds of image processing operations including image modification operations, image feature extraction operations and so forth. The image modification operations may include operations such as color interpolation, image sharpening, color correction, and so forth on the image pixel data 21. The image feature extraction operations may include operations like convolution, deconvolution, and so forth on the image pixel data 21.

In the image pixel data 21 of height H, width W in the IPU 20, the IPL 22 processes K*K pixel(s) data at a time and slides across the image pixel data 21 with a stride of S, where a K kernel size and an S stride size are greater than or equal to 1 and less than or equal to H and W. In addition, S is a next layer's stride. The next layer is the one which is connected to the shift register 33. In another words, this layer is connected to outputs of the plurality of multiplexers 36. The image pixel data 21 has the same structure as that of the image pixel data 21 shown in FIG. 3. The image pixel data 21 is configured with H rows of pixels, and each row of pixels has a width W.

The primary task of the linebuffer 30 is to buffer image pixel data 21. During the image processing operation performed by the IPL 22 on image pixel data 22, some or all pixel data are reused by the IPL 22. In order to facilitate the reuse of pixel data, the linebuffer 30 buffers the image pixel data 21.

Figure 15:
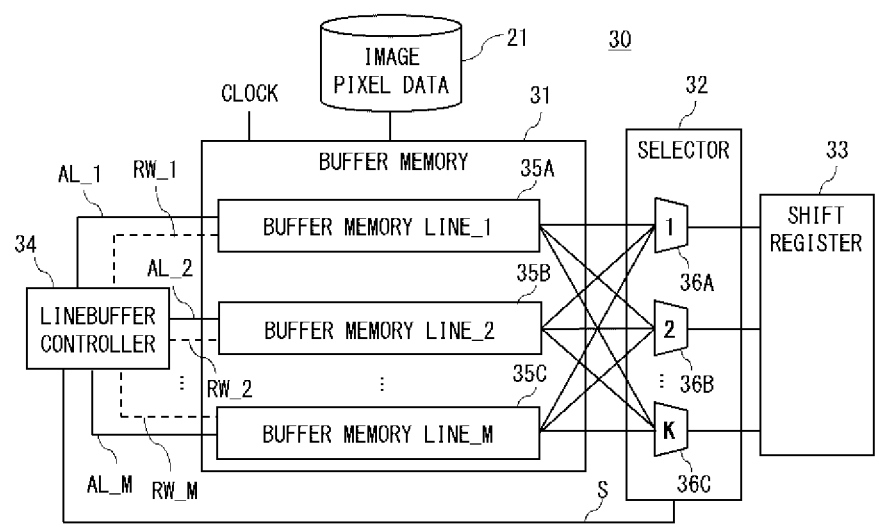
FIG. 15 is a configuration diagram illustrating the structure of a linebuffer 30.
Figure 16:
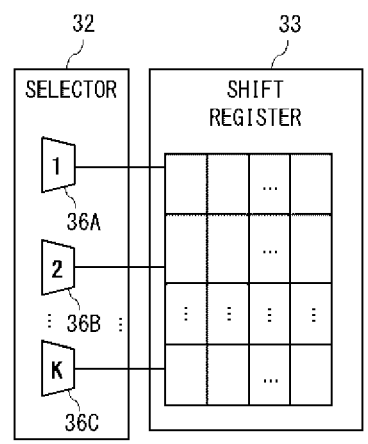
FIG. 16 is a configuration diagram illustrating a selector 32 and a shift register 33.

In FIGS. 15 and 16, the linebuffer 30 includes the buffer memory 31, selector 32, shift register 33, and linebuffer controller 34. In addition, the buffer memory 31 includes multiple buffer memory lines 35. The size of each buffer memory line 35 is the size of each buffer memory line 135 divided by N. The selector 32 includes multiple buffer memory line 35. The image pixels are written into the buffer memory lines 35 by using a writing clock, and are read by using a reading clock.

The buffer memory 31 stores the image pixel data 21. The size of the buffer memory 31 in the linebuffer 30 is not only dependent on W, K and S but also on the coefficient of partition N. The value of N is a positive integer and always greater than 1. In the single buffer memory line 35 of the linebuffer 30, the number of pixel data that can be stored is equal to a ceiling value of a ratio of W to N (i.e. W/N). Hence, one row of the image pixel data 21 is stored in N buffer lines. For the sake of simplicity, in this second example embodiment, the previous layer's channel size is equal to 1, but it can be any channel size.

K pixels given as output from buffer memory line 35 are accumulated by the shift registers 33. K*K pixels from the shift register 33 are read out by the IPL 22 to perform the image processing operations. The size of the shift register 33 is equal to K*K in terms of pixels data.

The linebuffer controller 34 generates address line signals and read signals for all the buffer memory lines 35 in the linebuffer 30 as shown in FIG. 15. The total number of the address lines signals from AL_1 to AL_M generated by the linebuffer controller 34 is equal to the number of buffer memory lines 35, i.e. M=N*K+S. Similarly, the total number of read signals from RW_1 to RW_M generated by the linebuffer controller 34 is equal to the number of buffer memory lines, i.e. M=N*K+S. Each read signal decides read or write state of each buffer memory line 35.

Furthermore, the linebuffer controller 34 generates a select signal (control signal) for each of the buffer memory line 35. The total number of the select signals generated by the linebuffer controller 34 is equal to the number of the multiplexers 36, i.e. K. In addition, each address line signal indicates address 0 to (W/N)−1 for storing a divided one row of the image data.

The function of the multiplexers 36 is to select pixel(s) of only one buffer memory line 35 at a time from the pixels of the multiple buffer memory line 35 based on the corresponding select signal. The size of the each multiplexer is (N*K+S)×1. The number of multiplexers remains the same as that of the reference example, i.e. equal to K.

All the K multiplexers 36 have input from all N*K+S buffer memory lines. The K multiplexers 36 output only pixels from K buffer memory lines 35 (i.e. one buffer memory line 35 by one multiplexer 36). Hence, total K pixels are output from all the multiplexers 36.

The necessary signals required for the flow of image pixel data 21 from input of the linebuffer 30 via the buffer memory 31, selector 32, and shift register 33 to output of the linebuffer 30 are generated by the linebuffer controller 34. A total time to read out or write in a whole buffer memory line 35 is referred to as one phase. The number of phases in the linebuffer 30 is equal to the number of buffer memory lines 35, i.e. M=N*K+S. The number of cycles in one phase is equal to the number of the cycles required to read out or write in a whole buffer memory line, i.e. (W/N).

The occurrence of the phase goes in the round robin fashion. The values of the signals generated by the linebuffer controller 34 in a particular phase will be the same when that particular phase is repeated.

The number of buffer memory lines 35 is equal to the sum of S of the previous IPU's IPL 22 and product of N and K of the next IPL 22 (i.e. N*K+S). Hence, the total number of pixel data stored in the buffer memory 31 of the linebuffer 30, also referred to as the total size of the buffer memory 31, is equal to the product of W/N and S+(N*K) (i.e. (W/N)*(N*K+S)).

Comparing the size of the buffer memory 31 in the linebuffer 30 with the size of the buffer memory 131 in the linebuffer 130 in terms of pixel data, the size of the buffer memory can be decreased by DS:

$$DS = W*(K+S) - (W/N)*(N*K+S) = W*S*(1-(1/N))$$ (2)

In the equation (2), the values of W and S are always positive, and the coefficient of partition N is always a positive integer greater than 1. Therefore, DS is always positive. Hence, it is proved that for all the values of N, S, K and W, the size of the buffer memory 31 in the linebuffer 30 is always less than that of the buffer memory 131 of the linebuffer 130.

Figures 17, 18:
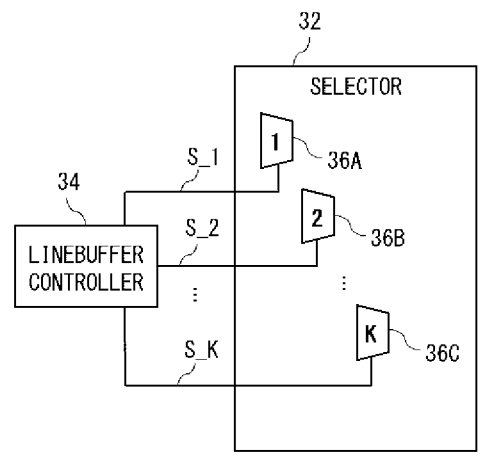
FIG. 17 is a configuration diagram illustrating the selector 32 and a linebuffer controller 34.
FIG. 18 is a list of parameters of reference linebuffers and the linebuffer 30.

FIG. 18 shows the relationship between the parameters of buffer memory 31 in the linebuffer 30 and the parameters of the buffer memory 131 in the reference linebuffer 130. As shown in FIG. 18, K, W, and S of the buffer memory 131 correspond to N*K, W/N, S of the buffer memory 31, respectively. Furthermore, the size of the buffer memory 131 is W*(K+S), which corresponds to the size of the buffer memory 31, (W/N)*(N*K+S).

Figures 19, 20:
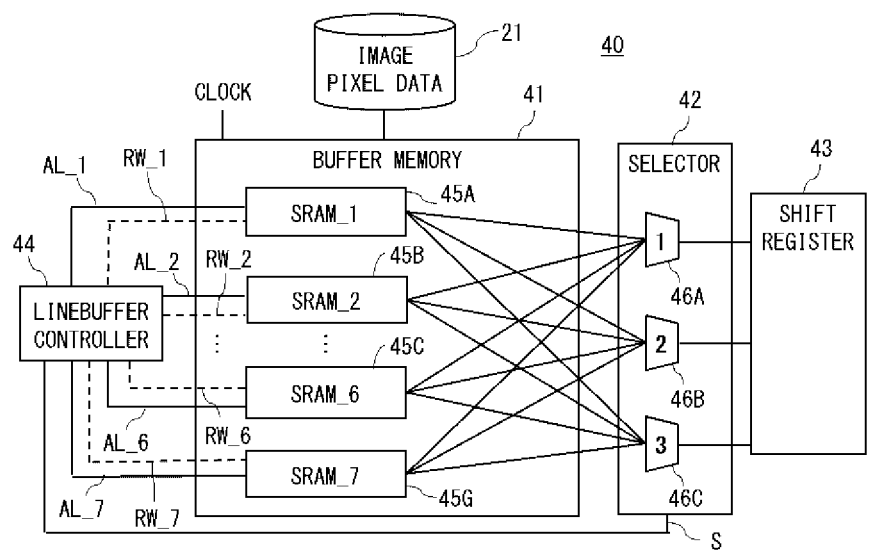
FIG. 19 is a list of sizes of reference linebuffers and the linebuffer 30.
FIG. 20 is a configuration diagram illustrating the structure of a linebuffer 40.

FIG. 19 shows a comparison of the size of the buffer memory 31 in the linebuffer 30 with the size of the buffer memory 131 in the reference linebuffer 130 with some example values. In FIG. 19, there are four examples; (a) K=3, S=1, W=100, N=2, (b) K=3, S=1, W=100, N=4, (c) K=3, S=2, W=100, N=2, (d) K=5, S=1, W=100, N=2. As mentioned before, the size of the buffer memory 31 is calculated by (W/N)*(S+N*K), while the size of the buffer memory 131 is calculated by W*(K+S).

In (a), the size of the buffer memory 31 is 350, while the size of the buffer memory 131 is 400. The former size is decreased to 87.50% of the latter one. In (b), the size of the buffer memory 31 is 325, while the size of the buffer memory 131 is 400. The former size is decreased to 81.25% of the latter one. In (c), the size of the buffer memory 31 is 400, while the size of the buffer memory 131 is 500. The former size is decreased to 80.00% of the latter one. In (d), the size of the buffer memory 31 is 550, while the size of the buffer memory 131 is 600. The former size is decreased to 91.67% of the latter. From these examples, it can be said that the higher the value of N is, the greater is the reduction in the size of the buffer memory 31 of the linebuffer 30.

A sample example of the linebuffer with K=3, S=1, and N=2 is shown in FIG. 20. The structure of the linebuffer 40 includes single ported SRAM memory-based buffer memory 41, selector 42, shift register 43 of size 3×3 in terms of pixel data, and linebuffer controller 44. The buffer memory 41 includes SRAM memory lines 45A to 45G and the selector 42 includes three 7×1 multiplexers 46A to 46C.

The linebuffer 40 buffers three rows of image pixel data 21 in six SRAM memory lines in 6 phases. Each phase is of W/2 cycles. The number of cycles required to write three rows in the six SRAM memory lines (i.e. one row is written in two SRAM memory lines) is 6*W/2 cycles, i.e. 6 phases.

Figures 21, 22:
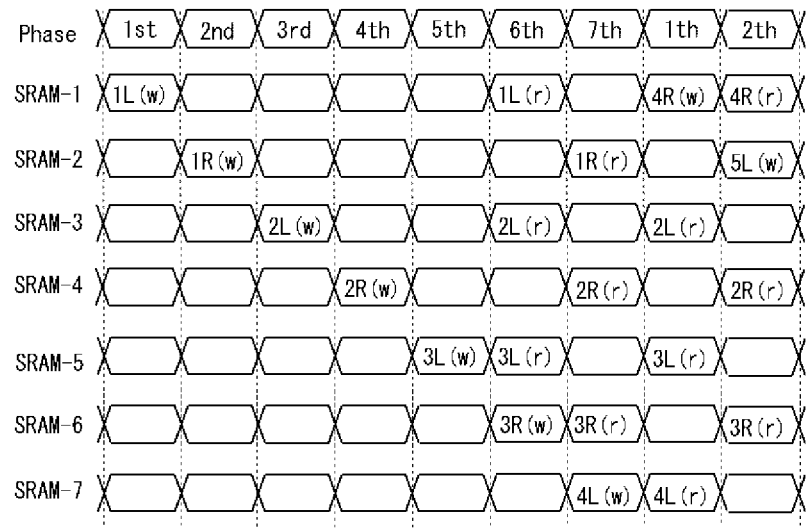
FIG. 21 is a timing diagram in terms of phase of the data flow in SRAM memory lines of the linebuffer 40.
FIG. 22 is a list of a status of the SRAM memory lines 45 in each phase.

FIG. 21 shows a timing diagram in terms of phase of the data flow in each SRAM memory line 45 of the linebuffer 40. In the 1st phase, the left half of the 1st row of the image pixel data 21 is written in SRAM-1 memory line 45A. In the 2nd phase, the right half of the 1st row of the image pixel data 21 is written in SRAM-2 memory line 45B. In FIG. 21, "1L(w)" means the former state and "1R(w)" means the latter state.

In the 3rd phase, the left half of the 2nd row of the image pixel data 21 is written in SRAM-3 memory line 45C. In the 4th phase, the right half of the 2nd row of the image pixel data 21 is written in SRAM-4 memory line 45D. In FIG. 21, "2L(w)" means the former state and "2R(w)" means the latter state.

In the 5th phase, the left half of the 3rd row of the image pixel data 21 is written in SRAM-5 memory line 45E. In FIG. 21, "3L(w)" means this state. In the 5th phase, after one cycle of writing the one pixel of the 3rd row of the image pixel data 21, all the required three pixels (one from each of the three rows of image pixel data 21) for the multiplexer to be read out are available in the SRAM memory lines. However, as single ported SRAM memory-based buffer memory is employed and the SRAM-5 memory line 45E is in the write state, a reading operation from the SRAM-5 memory line 45E cannot be started by the multiplexer in the 5th phase. From the 1st phase to the 5th phase, one of the SRAM memory lines is in active mode, while the others are in the inactive mode.

In the 6th phase, the right half of the 3rd row of the image pixel data 21 is written in SRAM-6 memory line 45F. In FIG. 21, "3R(w)" means this state. Furthermore, with the beginning of the 6th phase, three SRAM memory lines 45A, 45C and 45E are in the read state and the three memory lines 45 output three pixels at the same time. In FIG. 21, "1L(r)", "2L(r)", and "3L(r)" mean these states. In addition, 1L(r)", "2L(r)", and "3L(r)" are the same left side of the divided one row of data. From this reason, the latency cycle of the SRAM memory lines in the linebuffer 40 is 5*W/2 cycle. In the 6th phase, the SRAM memory lines 45A, 45C, 45E and 44F are in the active mode, while the others are in the inactive mode. In the 6th phase, read and write operations of the pixel data in the same row (the third row) of the image pixel data can be overlapped.

In the 7th phase, the left half of the 4th row of the image pixel data 21 is written in SRAM-7 memory line 45G. In FIG. 21, "4L(w)" means this state. Furthermore, with the beginning of the 7th phase, three SRAM memory lines 45B, 45D and 45F are in the read state and the three memory lines 45 output three pixels at the same time. In FIG. 21, "1R(r)", "2R(r)", and "3R(r)" mean these states. In addition, "1R(r)", "2R(r)", and "3R(r)" are the same right side of the divided one row of data. In the 7th phase, the memory lines 45B, 45D, 45F and 45G are in the active mode, while the others are in the inactive mode. Therefore, the linebuffer controller 34 generates select signals for the multiplexers 36 to take the divided one row of data at one phase, and to take the one row of data in 2 (N) phases.

In the next 1st phase, the right half of the 4th row of the image pixel data 21 is written in SRAM-1 memory line 45A. In FIG. 21, "4R(w)" means this state. Furthermore, with the beginning of the 1st phase, three SRAM memory lines 45C, 45E and 45G are in the read state and the three memory lines 45 output three pixels. In FIG. 21, "2L(r)", "3L(r)", and "4L(r)" mean these states. In the 1st phase, read and write operations of the pixel data in the same row (the fourth row) of the image pixel data can be overlapped.

In the next 2nd phase, the SRAM-2 memory line 45B is in the write state. In FIG. 21, "5L(w)" means this state. Furthermore, with the beginning of the 2nd phase, three SRAM memory lines 45A, 45D and 45F are in the read state and the three memory lines 45 output three pixels. In FIG. 21, "2R(r)", "3 R(r)", and "4R(r)" mean these states.

As above mentioned, partitioning the buffer memory lines 35 of the buffer memories 31 provides the flexibility to the linebuffer controller 34 to overlap the read and write operations of the pixel data in the same row of the image pixel data 21. With the advantage of the overlapped read and write operations, the total size of the required buffer memory 31 in the linebuffer 30 is less than that of buffer memory 131 in the linebuffer 130. Furthermore, another benefit of the overlapped read and write operations of the pixel data in the same row of the image pixel data 21 is the reduced number of cycles required to wait for a multiplexer to read the buffer memory lines.

FIG. 22 shows the states of the SRAM memory lines 45 in the linebuffer 40 in each phase. In FIG. 22, "R" means read state and "W" means write state. In the 1st phase, the SRAM_1 memory line 45A is in the write state, while the other SRAM memory lines are in the read state. In the 2nd phase, the SRAM_2 memory line 45B is in the write state, while the other SRAM memory lines are in the read state. In the 3rd phase, the SRAM_3 memory line 45C is in the write state, while the other SRAM memory lines are in the read state. In the 4th phase, the SRAM_4 memory line 45D is in the write state, while the other SRAM memory lines are in the read state. In the 5th phase, the SRAM_5 memory line 45E is in the write state, while the other SRAM memory lines are in the read state. In the 6th phase, the SRAM_6 memory line 45F is in the write state, while the other SRAM memory lines are in the read state. In the 7th phase, the SRAM_7 memory line 45G is in the write state, while the other SRAM memory lines are in the read state.

In the write states, the read signals are generated by the linebuffer controller 44. The address line signal goes from the first address to the last address in the respective SRAM memory line. The number of the multiplexers 46 is three and the size of each multiplexer is 7×1 as shown in FIG. 20.

Figures 23, 24:
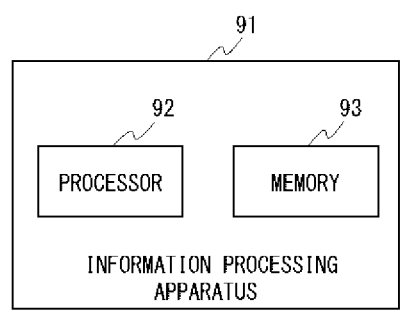
FIG. 23 is a list of the SRAM memory lines 45 selected by multiplexers 46 in each phase.
FIG. 24 is a configuration diagram of an information processing apparatus according to embodiments.

FIG. 23 shows the SRAM memory lines 45 selected in the consecutive phase by the multiplexers 46. In FIG. 23, "MUX1" means the multiplexer 46A, "MUX2" means the multiplexer 46B, and "MUX3" means the multiplexer 46C. In the 1st phase, the multiplexer 46A selects the SRAM_3 memory line 45C, the multiplexer 46B selects the SRAM_5 memory line 45E, and the multiplexer 46C selects the SRAM_7 memory line 45G. In the 2nd phase, the multiplexer 46A selects the SRAM_4 memory line 45D, the multiplexer 46B selects the SRAM_6 memory line 45F, and the multiplexer 46C selects the SRAM_1 memory line 45A. In the 3rd phase, the multiplexer 46A selects the SRAM_5 memory line 45E, the multiplexer 46B selects the SRAM_7 memory line 45G, and the multiplexer 46C selects the SRAM_2 memory line 45B. In the 4th phase, the multiplexer 46A selects the SRAM_6 memory line 45F, the multiplexer 46B selects the SRAM_1 memory line 45A, and the multiplexer 46C selects the SRAM_3 memory line 45C. In the 5th phase, the multiplexer 46A selects the SRAM_7 memory line 45G, the multiplexer 46B selects the SRAM_2 memory line 45B, and the multiplexer 46C selects the SRAM_4 memory line 45D. In the 6th phase, the multiplexer 46A selects the SRAM_1 memory line 45A, the multiplexer 46B selects the SRAM_3 memory line 45C, and the multiplexer 46C selects the SRAM_5 memory line 45E. In the 7th phase, the multiplexer 46A selects the SRAM_2 memory line 45B, the multiplexer 46B selects the SRAM_4 memory line 45D, and the multiplexer 46C selects the SRAM_6 memory line 45F.

In this way, when a phase is incremented by one, the multiplexers 46 selects the next SRAM memory line 45. Furthermore, in one phase, the multiplexer 46B selects the SRAM memory line, which is 2(=N) memory lines away from the SRAM memory line selected by the multiplexer 46A. Similarly, in one phase, the multiplexer 46C selects the SRAM memory line, which is 2(=N) memory lines away from the SRAM memory line selected by the multiplexer 46B.

From FIG. 23, it should be noted that SRAM memory lines 45 selected in the consecutive phase by each multiplexer 46 in the linebuffer 40 is different from SRAM memory lines selected in the consecutive phase by respective multiplexers in the linebuffer 230, shown in FIG. 10. As shown in FIG. 20, the shift register 43 inputs three image pixel data 21 from the SRAM memory lines 45. The shift register 43 accumulates 3×3 pixels and they are read out of the linebuffer 40 by IPL 22. With a stride of S=1, the IPL 22 continuously reads 3×3 pixels from shift register 43 to perform the image processing operations.

Compared to the latency cycles of the linebuffer 230 in the reference example, the latency cycles of the linebuffer 40 is W/2 cycles fewer. The improvement in the latency cycles is observed in the linebuffer 40. A plurality of IPUs 20 can be installed in the IP system, therefore, the total performance improvement in terms of latency cycle is equal to the product of the number of IPUs 20 and W/2.

Comparing the latency cycles of the buffer memory 31 in the linebuffer 30 with the latency cycles of the buffer memory 131 in the linebuffer 130 in terms of pixel data, the latency cycles can be decreased by DL:

$$DL=W*K-(W*(K-1)+W/N)=W*(N-1)/N \qquad (3)$$

In the equation (3), the value of W is always positive, and the coefficient of partition N is always a positive integer greater than 1. Therefore, DL is always positive. Hence it is proved that for all the values of N, K and W, the latency cycles of the buffer memory 31 in the linebuffer 30 are always less than those of the buffer memory 131 of the linebuffer 130 in the reference example.

The improvement in the latency cycles can be observed in the linebuffer 30. A plurality of IPUs 20 can be installed in the IP system, therefore, the total performance improvement in terms of latency cycle is equal to the product of the number of the IPUs 20 and W*(N−1)/N.

For this reason, the present disclosure provides not only an area-efficient structure but also an improvement of the performance in terms of latency cycles.

As explained above, the previous layer's channel size can be any channel size. Furthermore, width W can be replaced with the next layer's input frame's min (height, width). Suppose that the linebuffer is formed in one layer and it connects two adjacent layers in Application Specific Integrated Circuit (ASIC), the next layer's Kernel size is equal to K, the next layer's input frame's min (height, width) is equal to D, the next layer's stride is equal to S, and the previous layer's channel size is equal to C. In this case, in terms of pixel, the size of one SRAM line in the linebuffer is (D/N)*C, and the total size of SRAM lines in the linebuffer is (D/N)*C*(N*K+S). This example's effect is similar to the one explained before. In addition, D can be replaced with either the height or width of the input image, which can be defined as a next layer's input frame's height or width.

Furthermore, the sum of the size of the SRAM memory line 45 may be over W/2, under the conditions that the effect mentioned above continues. For example, in FIG. 20, the size of one SRAM memory line 45 may be from W/2 to (W/2)*W*(K+S)/((2K+S)*W/2).

Third Example Embodiment

As shown above, the structure of the second example embodiment linebuffer includes the shift register 43, which accumulates the output from the multiplexers. However, this shift register is not a mandatory component. In the third example embodiment, the linebuffer includes a buffer memory, multiplexers, and a linebuffer controller but not a shift register.

The linebuffer has the buffer memory lines that are partitioned into N smaller parts. The width of the buffer memory lines in the buffer memory is equal to W/(K*N) in terms of pixel data. The number of buffer memory lines is equal to the sum of S*K and K*K*N, i.e. (K*K*N+S*K). The total number of pixel data stored in the buffer memory of the linebuffer, also referred to as the total size of the buffer memory is equal to the product of W/N and S+N*K (i.e. (W/N)*(S+N*K)). The size of the buffer memory in the third example embodiment and that of the buffer memory in the second embodiment are the same in terms of pixel data.

The reduction in the size of the buffer memory in the third embodiment as compared to size of the buffer memory 301 in the linebuffer 330 in terms of pixel data is shown in the equation (2). As mentioned earlier, the values of W and S are always positive, and the coefficient of partition N is always a positive integer greater than 1. The difference between the size of the buffer memory 301 in the linebuffer 330 and the size of the buffer memory in the third embodiment is always positive. Hence, it is proved that for all the values of N, S, K and W, the size of the buffer memory in the third embodiment is always less than size of the buffer memory 301 of the linebuffer 330.

In general, compared to the latency cycles of the linebuffer 330, the latency cycles of this embodiment are W*(N−1)/N cycle are fewer as shown in the equation (3). The improvement in the latency cycles is observed in the third embodiment. A plurality of IPUs 20 can be installed in the IP system, therefore, the total performance improvement in terms of latency cycle is equal to the product of the number of the IPUs 20 and W*(N−1)/N.

Next, a configuration example of the information processing apparatus explained in the above-described plurality of embodiments is explained hereinafter with reference to FIG. 24.

FIG. 24 is a block diagram showing a configuration example of the information processing apparatus. As shown in FIG. 24, the information processing apparatus 91 includes a processor 92 and a memory 93.

The processor 92 performs processes performed by the information processing apparatus 91 explained with reference to the sequence diagrams and the flowcharts in the above-described embodiments by loading software (a computer program) from the memory 93 and executing the loaded software. The processor 92 may be, for example, a microprocessor, an MPU (Micro Processing Unit), or a CPU (Central Processing Unit). The processor 92 may include a plurality of processors.

The memory 93 is formed by a combination of a volatile memory and a nonvolatile memory. The memory 93 may include a storage disposed apart from the processor 92. In this case, the processor 92 may access the memory 93 through an I/O interface (not shown).

In the example shown in FIG. 24, the memory 93 is used to store a group of software modules. The processor 92 can perform processes performed by the information processing apparatus explained in the above-described embodiments by reading the group of software modules from the memory 93 and executing the read software modules.

As explained above with reference to FIG. 24, each of the processors included in the information processing apparatus in the above-described embodiments executes one or a plurality of programs including a group of instructions to cause a computer to perform an algorithm explained above with reference to the drawings.

Furthermore, the information processing apparatus 91 may include the network interface. The network interface is used for communication with other network node apparatuses forming a communication system. The network interface may include, for example, a network interface card (NIC) in conformity with IEEE 802.3 series. The information processing apparatus 91 may receive the Input Feature Maps or send the Output Feature Maps using the network interface.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Part of or all the foregoing embodiments can be described as in the following appendixes, but the present invention is not limited thereto.

Supplementary Note 1

An information processing apparatus comprising:
 a plurality of memories configured to store one row of data of input image data as a whole,
 a plurality of multiplexers configured to select one of the memories to take a part of the one row of data from the selected memory; and
 a controller configured to select one of the memories storing the part of the one row of data.

Supplementary Note 2

The information processing apparatus according to Supplementary Note 1,
 wherein the part of the one row of data is the one row of data divided by N, while N is a positive integer greater than 1.

Supplementary Note 3

The information processing apparatus according to Supplementary Note 2,
 wherein the number of the memories is (N*K)+S, while K is the number of the multiplexers and S is a stride of a layer which is connected to outputs of the plurality of multiplexers.

Supplementary Note 4

The information processing apparatus according to any one of Supplementary Notes 1 to 3,
wherein the memories are single-ported.

Supplementary Note 5

The information processing apparatus according to any one of Supplementary Notes 1 to 4, further comprising a shift register configured to store output of the multiplexers.

Supplementary Note 6

The information processing apparatus according to any one of Supplementary Notes 1 to 5,
wherein a read operation of the part of the one row of data and a write operation of another part of the one row of data are done in the same phase in different memories.

Supplementary Note 7

The information processing apparatus according to Supplementary Note 2 or 3, the controller generates control signals for the multiplexers to take the divided one row of data at one phase, and to take the one row of data in N phases.

Supplementary Note 8

An image processing unit comprising:
a plurality of memories configured to store one row of data of input image data as a whole,
a plurality of multiplexers configured to select one of the memories to take a part of the one row of data from the selected memory; and
a controller configured to select one of the memories storing the part of the one row of data.

Supplementary Note 9

The image processing unit according to Supplementary Note 8,
wherein the part of the one row of data is the one row of data divided by N, while N is a positive integer greater than 1.

Supplementary Note 10

An image processing method comprising:
storing one row of data of input image data into a plurality of memories as a whole,
selecting one of the memories to take a part of the one row of data from the selected memory; and
selecting one of the memories storing the part of the one row of data.

Supplementary Note 11

A non-transitory computer readable medium storing a program for causing a computer to execute:
storing one row of data of input image data into a plurality of memories as a whole,
selecting one of the memories to take a part of the one row of data from the selected memory; and
selecting one of the memories storing the part of the one row of data.

Note that the present disclosure is not limited to the above-described embodiments and can be modified as appropriate without departing from the spirit and scope of the present disclosure.

REFERENCE SIGNS LIST 1, 2 information processing apparatus
10, 20 image processing unit
11 memory
12 multiplexer
13 controller
21 image pixel data
22 image processing logic
30, 40 linebuffer
31, 41 buffer memory
32, 42 selector
33, 43 shift register
34, 44 linebuffer controller
35 buffer memory line
45 SRAM memory line
36, 46 multiplexer

What is claimed is:
1. An information processing apparatus comprising:
a plurality of memories configured to store one row of data of input image data as a whole,
a plurality of multiplexers configured to select one of the memories to take a part of the one row of data from the selected memory; and
a hardware controller configured to select one of the memories storing the part of the one row of data;
wherein the part of the one row of data is the one row of data divided by N, while N is a positive integer greater than 1; and
the number of the memories is (N*K)+S, while K is the number of the multiplexers and S is a stride of a layer which is connected to outputs of the plurality of multiplexers.
2. The information processing apparatus according to claim 1,
wherein the memories are single-ported.
3. The information processing apparatus according to claim 1,
further comprising a shift register configured to store output of the multiplexers.
4. The information processing apparatus according to claim 1,
wherein a read operation of the part of the one row of data and a write operation of another part of the one row of data are done in the same phase in different memories.
5. The information processing apparatus according to claim 1,
the hardware controller generates control signals for the multiplexers to take the divided one row of data at one phase, and to take the one row of data in N phases.
6. An image processing method comprising:
storing one row of data of input image data into a plurality of memories as a whole,
selecting, by a plurality of multiplexers, one of the memories to take a part of the one row of data from the selected memory; and
selecting one of the memories storing the part of the one row of data;
wherein the part of the one row of data is the one row of data divided by N, while N is a positive integer greater than 1; and the number of the memories is (N*K)+S, while K is the number of the multiplexers and S is a stride of a layer which is connected to outputs of the plurality of multiplexers.

7. A non-transitory computer readable medium storing a program for causing a computer to execute:
- storing one row of data of input image data into a plurality of memories as a whole,
- selecting, by a plurality of multiplexers, one of the memories to take a part of the one row of data from the selected memory; and
- selecting one of the memories storing the part of the one row of data;
- wherein the part of the one row of data is the one row of data divided by N, while N is a positive integer greater than 1; and
- the number of the memories is (N*K)+S, while K is the number of the multiplexers and S is a stride of a layer which is connected to outputs of the plurality of multiplexers.

* * * * *